US008904268B2

(12) United States Patent
Shi

(10) Patent No.: US 8,904,268 B2
(45) Date of Patent: Dec. 2, 2014

(54) METHOD, APPARATUS, AND COMMUNICATION SYSTEM FOR TRANSMITTING GRAPHIC INFORMATION

(75) Inventor: Teng Shi, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/456,769

(22) Filed: Apr. 26, 2012

(65) Prior Publication Data

US 2012/0278692 A1 Nov. 1, 2012

Related U.S. Application Data

(63) Continuation of application No. PCT/CN2010/080487, filed on Dec. 30, 2010.

(30) Foreign Application Priority Data

Dec. 30, 2009 (CN) .......................... 2009 1 0261821

(51) Int. Cl.
*G06F 17/00* (2006.01)
*H04L 29/08* (2006.01)
*H04L 29/06* (2006.01)

(52) U.S. Cl.
CPC ................ *H04L 67/02* (2013.01); *H04L 67/06* (2013.01); *H04L 67/2842* (2013.01); *H04L 65/608* (2013.01)
USPC ............ 715/201; 715/202; 715/205; 715/208

(58) Field of Classification Search
USPC .......................... 715/201, 202, 203, 205, 208
See application file for complete search history.

(56) References Cited

U.S. PATENT DOCUMENTS

| 5,813,008 A | 9/1998 | Benson et al. |
| 6,516,191 B1 | 2/2003 | Greenspan et al. |
| 6,547,829 B1 * | 4/2003 | Meyerzon et al. ............ 715/234 |

(Continued)

FOREIGN PATENT DOCUMENTS

| CN | 101060637 | 10/2007 |
| CN | 101098311 | 1/2008 |
| CN | 101594523 | 12/2009 |

OTHER PUBLICATIONS

3GPP TS 26.430 V1.0.0 (Dec. 2009), $3^{rd}$ Generation Partnership Project; Technical Specification Group Services and System Aspects; Timed Graphics (Release 9) (18 pages).

(Continued)

*Primary Examiner* — Stephen Hong
*Assistant Examiner* — Matthew Ludwig
(74) *Attorney, Agent, or Firm* — Staas & Halsey LLP

(57) ABSTRACT

The present invention discloses a method, an apparatus, and a communication system for transmitting graphic information. In the technical solution of the present invention, the graphic information carries a hyperlink and an identifier of the hyperlink so that when the terminal receives the graphic information, the terminal may judge, according to the identifier of the hyperlink, whether the hyperlink has been processed, and the terminal requests the graphic from the network according to the hyperlink only when determining that the hyperlink has not been processed, therefore ensuring an effective decrease in bandwidth consumption of broadcast or multicast channels, effectively avoiding repeated processing and presentation of a same hyperlink by the terminal, and reducing the complexity of the processing of the terminal.

9 Claims, 5 Drawing Sheets

(56) References Cited

U.S. PATENT DOCUMENTS

| | | | |
|---|---|---|---|
| 7,139,813 | B1 | 11/2006 | Wallenius |
| 8,024,765 | B2 * | 9/2011 | Ramanathan et al. ......... 725/110 |
| 8,051,450 | B2 * | 11/2011 | Robarts et al. .................. 725/53 |
| 8,108,899 | B2 * | 1/2012 | Shoff et al. ..................... 725/52 |
| 2003/0084444 | A1 * | 5/2003 | Ullman et al. .................. 725/40 |
| 2007/0192672 | A1 * | 8/2007 | Bodin et al. ............... 715/500.1 |
| 2007/0247594 | A1 | 10/2007 | Tanaka |
| 2007/0271578 | A1 | 11/2007 | Thenthiruperai et al. |

OTHER PUBLICATIONS

European Search Report issued Sep. 4, 2012 in corresponding European Patent Application No. 10840588.7 (8 pages).

Written Opinion of the International Searching Authority issued Apr. 7, 2011 in corresponding International Patent Application No. PCT/CN2010/080487 (3 pages) (3 pages English translation).

International Search Report, mailed Apr. 7, 2011, in corresponding International Application No. PCT/CN2010/080487 (7 pp.).

Second Chinese Office Action mailed Jun. 5, 2013 in corresponding Chinese Patent Application No. 200910261821.X (5 pages) (6 pages English Translation).

First Chinese Office Action issued Dec. 25, 2012 in corresponding Chinese Patent Application No. 200910261821.X (7 pages) (5 pages English translation).

\* cited by examiner

METHOD, APPARATUS, AND COMMUNICATION SYSTEM FOR TRANSMITTING GRAPHIC INFORMATION

This application is a continuation of International Application No. PCT/CN2010/080487, filed on Dec. 30, 2010, which claims priority to Chinese Patent Application No. 200910261821.X, filed on Dec. 30, 2009, both of which are hereby incorporated by reference in their entireties.

FIELD OF THE INVENTION

The present invention relates to the field of communications technologies, and in particular, to a method, an apparatus, and a communication system for transmitting graphic information.

BACKGROUND OF THE INVENTION

With the development of digital broadcast television technologies and the convergence of communication services, the presentation of media become richer and more colorful, and in addition to conventional audio and video, the presentation may also include text, graphics, animation, and support for user interaction. These additional captions, graphics, and the like can provide users with value-added services such as movie captions, titles, additional information prompts, advertisements, and notifications.

For the presentation of the converged content, there are different implementation schemes and technical standards. A typical scheme is as follows: A head-end system is responsible for integrating all converged content, and a terminal supports rich media (Rich Media) technologies to realize the presentation of various media and applications.

The timed text (Timed Text, commonly called "caption") proposed by the 3rd Generation Partnership Project (3GPF, 3rd Generation Partnership Project), and the newly proposed timed graphics (TG, Timed Graphics) work item, provide another thought and option for the presentation of the converged content. The objective of the TG work item is to use a separate graphic stream in parallel with a video stream to send additional graphic information to a terminal, where the graphic information may be used for presenting a name tag, a score box, a game result chart, and so on.

The 3GPP defines the timed text standards for transmitting captions, where the content of captions may be associated with a hyperlink, and by clicking the captions associated with the hyperlink, users can have access to the WEB (a type of Web page) content corresponding to the hyperlink. In the prior art, the hyperlink associated with the captions is stored in a file in a 3GPP file format (3GP, 3GPP file format), and when the server reads the 3GP file, the server constructs a Real-time Transport Protocol (RTP, Real-time Transport Protocol) packet according to information included in the 3GP file and then sends the RTP packet including relevant content to the terminal through RTP. After receiving the RTP packet, the terminal displays the captions that relate to the RTP packet, that is, displays the captions associated with the hyperlink. The user may click the captions associated with the hyperlink. At this time, the terminal invokes a relevant application, such as a browser, to access a related WEB page or a Wireless Application Protocol (WAP, Wireless Application Protocol) page. After the user launches the browser to access a related page, the operation of the browser and the play of the video are completely independent, and the user can decide whether to close the browsed page.

In the research and practice of the prior art, the inventor of the present invention finds that sometimes the server repeatedly sends the same hyperlink to the terminal and that when receiving the same hyperlink, the terminal must also repeatedly process and present it, which undoubtedly increases the complexity of the processing of the terminal.

SUMMARY OF THE INVENTION

Embodiments of the present invention provide a method, an apparatus, and a communication system for transmitting graphic information, which can avoid repeated processing and presentation of a same hyperlink by a terminal and therefore decrease the complexity of the processing of the terminal.

A method for transmitting graphics information includes:
  acquiring graphic information, where the graphic information carries a hyperlink and an identifier of the hyperlink;
  judging, according to the identifier of the hyperlink, whether the hyperlink has been processed; and
  when determining that the hyperlink has not been processed, acquiring a graphic from a network according to the hyperlink, and presenting the acquired graphic according to the graphic information.

A terminal includes:
  an acquiring unit, configured to acquire graphic information, where the graphic information carries a hyperlink and an identifier of the hyperlink;
  a processing judging unit, configured to judge, according to the identifier of the hyperlink that is acquired by the acquiring unit, whether the hyperlink has been processed;
  a requesting unit, configured to acquire graphic from a network according to the hyperlink when the processing judging unit determines that the hyperlink has not been processed; and
  a displaying unit, configured to present, according to the graphic information, the graphic acquired by the requesting unit.

A network device includes:
  a sending unit, configured to send graphic information to a terminal, where the graphic information carries a hyperlink and an identifier of the hyperlink so that the terminal can judge, according to the identifier of the hyperlink, whether the hyperlink has been processed; and
  a receiving unit, configured to send graphic to the terminal when receiving from the terminal a request for the graphic.

A communication system includes:
  a terminal, configured to acquire graphic information, where the graphic information carries a hyperlink and an identifier of the hyperlink; judge, according to the identifier of the hyperlink, whether the hyperlink has been processed; and when determining that the hyperlink has not been processed, acquire graphic from a network according to the hyperlink and present the acquired graphic according to the graphic information; and
  a network device, configured to send graphic information to the terminal, and when receiving from the terminal a request for a graphic, send the graphic to the terminal.

In the embodiments of the present invention, the graphic information carries a hyperlink and an identifier of the hyperlink so that when the terminal receives the graphic information, the terminal can judge, according to the identifier of the hyperlink, whether the hyperlink has been processed, and the terminal acquires a graphic from the network according to the hyperlink only when determining that the hyperlink has not been processed, therefore ensuring an effective decrease in bandwidth consumption of broadcast or multicast channels, effectively avoiding repeated processing and presentation of a same hyperlink by the terminal, and reducing the complexity of the processing of the terminal.

BRIEF DESCRIPTION OF THE DRAWINGS

To make the technical solution of the embodiments of the present invention clearer, the accompanying drawings used in the description of the embodiments are briefly described. Evidently, the accompanying drawings illustrate only some exemplary embodiments of the present invention and persons skilled in the art can obtain other drawings based on these drawings without creative efforts.

DETAILED DESCRIPTION OF THE EMBODIMENTS

The technical solution of the embodiments of the present invention is hereinafter described clearly and completely with reference to the accompanying drawings in the embodiments of the present invention. It is evident that the described embodiments are only some exemplary embodiments of the present invention, rather than all embodiments of the present invention. All other embodiments that persons skilled in the art obtain without creative efforts based on the embodiments of the present invention also fall within the scope of the present invention.

Embodiments of the present invention provide a method, an apparatus, and a communication system for transmitting graphic information, which are hereinafter described in detail.

An embodiment is described from the perspective of a terminal, where the terminal needs to support acquisition of graphics by means of interaction.

Figure 1:
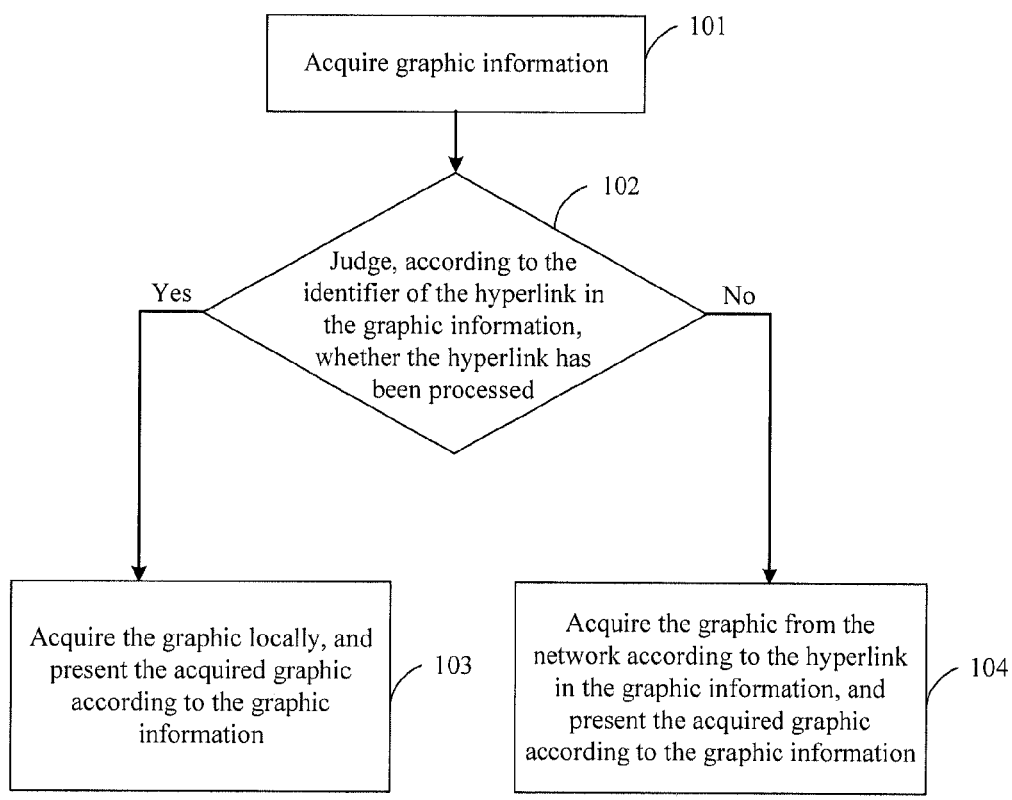
FIG. 1 is a flowchart of a method according to an embodiment of the present invention.

A method for transmitting graphic information includes: acquiring graphic information, where the graphic information carries a hyperlink and an identifier of the hyperlink; judging, according to the identifier of the hyperlink, whether the hyperlink has been processed; and if yes, acquiring a graphic corresponding to the hyperlink locally and presenting the acquired graphic according to the graphic information, and if no, requesting the graphic from the network according to the hyperlink, and presenting the acquired graphic according to the graphic information. As shown in FIG. 1, the specific flow may be as follows:

101. Acquire graphic information, where the graphic information carries a hyperlink and an identifier of the hyperlink, and the identifier of the hyperlink has a one-to-one correspondence with the hyperlink.

For example, a graphic stream sent by the network may be received, where the graphic stream is carried by means of RTP, and the graphic stream is independent of a video content transmission stream; after receiving the graphic stream, the terminal parses the graphic stream and judges which one is carried in the graphic stream, graphic or graphic information; and if a graphic is carried, the terminal processes the graphic, for example, presents the graphic, or if graphic information is carried, the terminal acquires the graphic information and further processes the graphic information.

In another example, the graphic information may be stored locally, and the network updates the graphic information in real time. When the terminal needs to acquire the graphic information, the terminal acquires the graphic information locally.

Certainly, the graphic information may also carry presentation position information and/or presentation time information and/or temporarily saving time information.

The presentation position information is used for indicating the presentation position of the graphic, that is, for indicating where the graphic is to be presented.

The presentation time information is used for indicating the end time of the presentation of the graphic, that is, for indicating how long the graphic is to be presented and when the presentation of the graphic is to be stopped.

The temporarily saving time information is used for indicating whether there is a need to store the graphic in a register, and how long the graphic is to be stored in the register.

102. Judge, according to the identifier of the hyperlink in the graphic information, whether the hyperlink has been processed, and if the hyperlink has been processed, optionally step 103 may be executed; and if the hyperlink has not been processed, step 104 may be executed.

For example, an identifier recording table may be maintained, where the identifier recording table is used for recording the identifiers of the hyperlinks that have been processed and the identifiers of the hyperlinks that are being processed, and subsequently, when acquiring the graphic information, as described in step 101, the terminal can judge, according to the identifier of the hyperlink carried in the graphic information, whether the identifier recording table has an identifier that is the same as the identifier of the hyperlink. If yes, the terminal determines that the hyperlink has been processed; and if no, the terminal determines that the hyperlink has not been processed.

103. Acquire the graphic corresponding to the hyperlink locally, for example, from a local register, and present the acquired graphics according to the graphic information.

104. Acquire the graphic from the network according to the hyperlink in the graphic information, and present the acquired graphic according to the graphic information. If in step 102, the terminal maintains the identifier recording table and judges, according to the identifier recording table, whether the hyperlink has been processed, then when the terminal determines that the hyperlink has not been processed, the terminal also needs to record the identifier of the hyperlink in the identifier recording table.

Presenting the acquired graphic according to the graphic information in step 103 and step 104 may be as follows:

If the graphic information also carries presentation position information (refer to the graphic information in step 101), then the terminal determines the presentation position of the graphic according to the presentation position information in the graphic information and displays the graphic at the presentation position.

If the graphic information also carries presentation time information (refer to the graphic information in step 101), then the terminal stops presenting the graphic when the terminal determines, according to the presentation time information in the graphic information, that the time for presenting the graphic expires.

If the graphic information also carries temporarily saving time information (refer to the graphic information in step 101), then when the terminal determines, according to the temporarily saving time information in the graphic information, that the graphic needs to be saved temporarily, the terminal saves the graphic in a register, so that when the presentation time of the graphic ends, the graphic can be invoked again, and when the terminal determines, according to the temporarily saving time information, that the temporarily saving time of the graphic expires, the graphic is deleted from the register.

Certainly, these scenarios may be combined freely, for example, if the graphic information also carries presentation position information, presentation time information, and temporarily saving time information, the terminal may present the graphic within the time specified by the presentation time information and at the position indicated by the presentation position information in the graphic information, and determines, according to the indication of the temporarily saving time information, whether to save the graphic into the register or not and the time period during which the graphic are saved in the register, and so on.

As can be known from the foregoing description, in the embodiment of the present invention, the graphic information carries a hyperlink and an identifier of the hyperlink so that when the terminal receives the graphic information, the terminal can judge, according to the identifier of the hyperlink, whether the hyperlink has been processed, and the terminal acquires a graphic from the network according to the hyperlink only when determining that the hyperlink has not been processed, therefore ensuring an effective decrease in bandwidth consumption of broadcast or multicast channels, effectively avoiding repeated processing and presentation of a same hyperlink by the terminal, and reducing the complexity of the processing of the terminal.

According to the method described in the foregoing embodiment, detailed description is made hereinafter by taking a TG system as an example. The TG system needs to support acquisition of graphics by means of interaction.

To make the description clearer, in this embodiment, the hyperlink described in the foregoing embodiment is described as a graphic address. It should be understood that actually, the hyperlink of the graphic may not only be a graphic address, but also be a triggering address of a certain device. When the hyperlink is clicked in order to request the graphic from a network device, the "certain device" is triggered, and therefore graphic associated with the certain device is invoked to the network device and the network device delivers the graphic to the terminal, where the network device may be a TG head end and the terminal may be a TG device.

Firstly, the graphic address is carried in an RTP packet in a fixed format as a type of content of the TG system. Meanwhile, the following description parameters may be added for the graphic address:

(1) a hyperlink identifier, which is an identifier of the graphic address here: is used by the terminal for quickly judging whether the content has been processed, and has a one-to-one correspondence with the hyperlink;

(2) presentation position information: is used for indicating the presentation position of the graphic (optional);

(3) presentation time information: is used for indicating the presentation end time of the graphic (optional); and (4) temporarily saving time information: is used for indicating whether and how long the graphic is to be saved temporarily, so that the graphic can be used again at the presentation end time (optional).

Here, the graphic address and these description parameters for the graphic address are referred to as graphic address information. The graphic address information may be saved in the form of a standard file format, and specifically, the graphic information may be saved in a 3GP file format in the form of an independent data format, where the data structure saved in the 3GP file format may be as follows:

```
class GraphicLinkSample
{
  unsigned int(16) linkID; //The identifier of the hyperlink (graphic
  address here).
  unsigned int(8)  URLLength;     //The length of the hyperlink (graphic
  address here).
  unsigned int(8)  URL[URLLength];    //The content of the hyperlink
  (graphic address here).
  GrapchicPositionBox   location;//The presentation position information
  of the graphic.
  NTPtimeBox    time;   //The presentation time information, that is, the
  description of presentation time.
  TmpSaveTime    save_time; //If this parameter appears, it means that
  when the presentation ends, the graphic corresponding to the graphic
  address is to be temporarily saved into a register for subsequent use,
  where save_time means the saving time in the register.
}
```

The graphic information existing in the 3GP file format may be saved in a storage device of the network device, or in storage devices of other servers, and subsequently, when the network device requires the graphic information, the network device acquires the graphic information from these storage devices again, for example, directly extracts the graphic information from a hard disk, or acquires the graphic information through a signaling message. Certainly, the graphic information may also be saved locally, and the network updates the graphic information in real time. When the terminal needs to acquire the graphic information, the terminal acquires the graphic information locally.

The presentation time corresponding to the hyperlink, that is, the graphic address, may be obtained through a corresponding description in a sample to time table in the 3GP file format, for example, the terminal may query the sample to time (sample to time) table according to the graphic address or the identifier of the graphic address (such as linkID in the foregoing data structure), therefore obtaining the presentation time of the graphic corresponding to the graphic address or the identifier of the graphic address.

Figure 2:
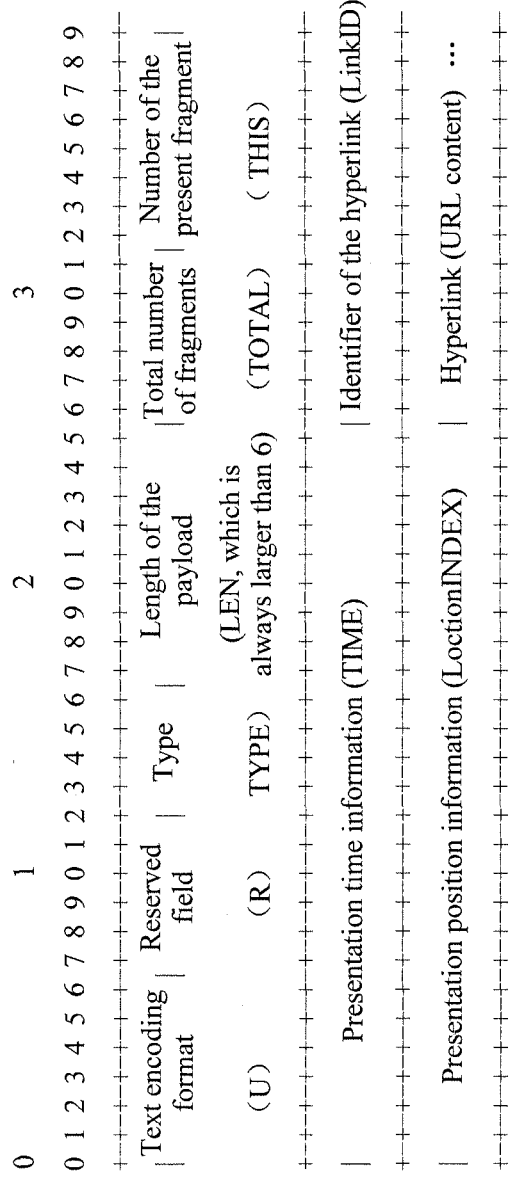
FIG. 2 is a schematic diagram of a format of an RTP packet according to an embodiment of the present invention.

When transmission of graphic information is required, the network device, such as a server, encapsulates the graphic address information into an RTP packet according to the content saved in the 3GP file, where the format of the RTP packet may be as shown in FIG. 2. It should be noted that the packet structure described in FIG. 2 does not include a general RTP header, and is only a format of the payload part in RTP.

As shown in FIG. 2, the parameters in the RTP packet are described as follows:

U: represents a text encoding format. In case of UTF-8, U=0; and in case of UTF-16, U=1;
R: represents a reserved field;
TYPE: represents the type of the packet;
LEN: represents the length of the payload (payload);
TOTAL: represents the total number of fragments;
THIS: represents the number of the present fragment;

TIME: presentation time information, which represents the presentation time of the graphic corresponding to the link and may be a time interval starting from a timestamp (timestamp) corresponding to the present RTP packet or the end time described using NTPtimeBox (see the foregoing data structure), for example, if the "time" of the NTPtimeBox in the data structure in the 3GP file format is 10 seconds, the TIME here is 10 seconds;

LINKID: represents the identifier corresponding to the present hyperlink (graphics address here), which is used by the terminal for quickly judging whether the present content has been processed, and if yes, discarding the content;

LoctionINDEX: represents the presentation position information of the graphic corresponding to the present hyperlink (graphics address here); it should be noted that this may be an index, and the specific position description information may be transmitted separately through another type of RTP packet; and URL content: represents the specific content of the hyperlink, which is the graphic address in this embodiment.

Figure 3:
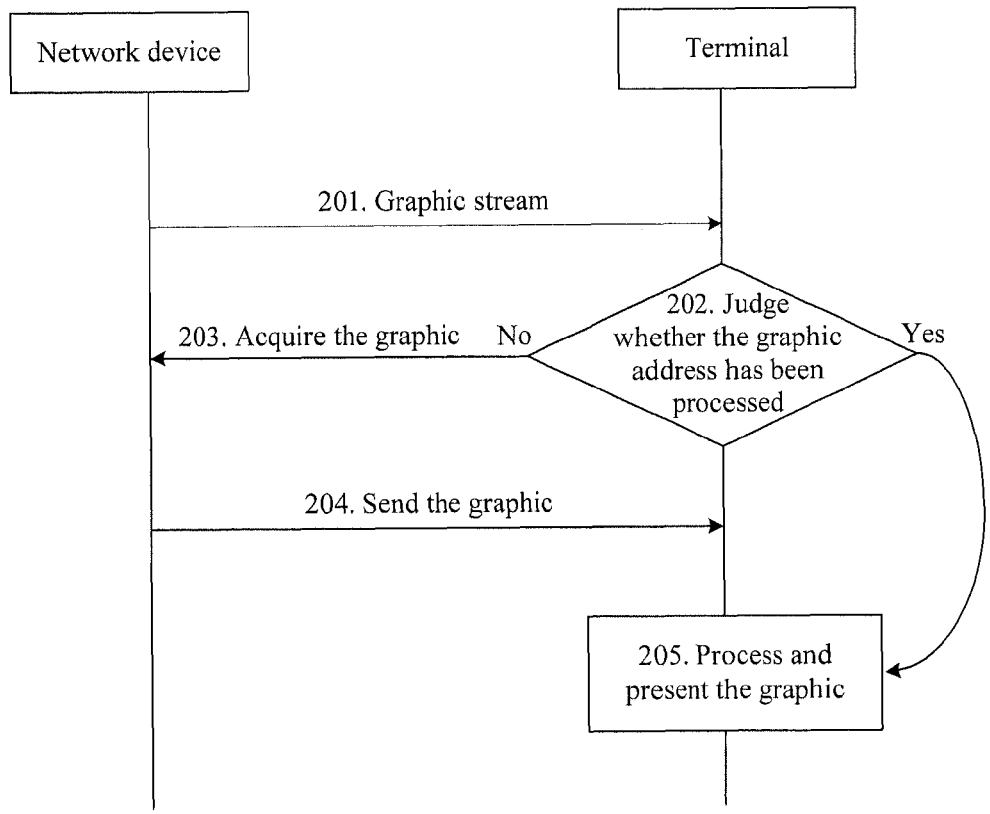
FIG. 3 is an overall flowchart of a method according to another embodiment of the present invention.

After encapsulating the RTP packet according to the foregoing method, the network device transmits the RTP packet to the terminal, and after receiving the RTP packet, the terminal automatically judges, according to the information in the packet, whether the graphic has been acquired, whether the graphic needs to be acquired again, how the graphic is to be acquired, and how the graphic is to be presented. As shown in FIG. 3, the overall flowchart may be as follows:

201. After joining into a broadcast or multicast address, the terminal starts to receive a graphic stream delivered by the network device, where the graphic stream is a graphic stream encapsulated in an RTP packet format.

202. After receiving the graphic stream, the terminal parses the RTP packet, and processes the graphic address according to the graphic address information in the RTP packet. If the terminal determines, according to the identifier of the graphic address in the graphic address information, that the graphic address has not been processed, step 203 is executed.

203. The terminal requests the graphic from the network device according to the graphic address in the graphic address information.

204. The network device delivers the graphic requested in step 203.

205. After receiving the graphic, the terminal processes and presents the graphic, that is, presents the graphic according to the presentation position information and the presentation time information that is in the graphic address information, and the terminal determines, according to the indication of the temporarily saving time information, whether and how long the graphic needs to be temporarily saved. Details are provided in the processing flow of the terminal.

Figure 4:
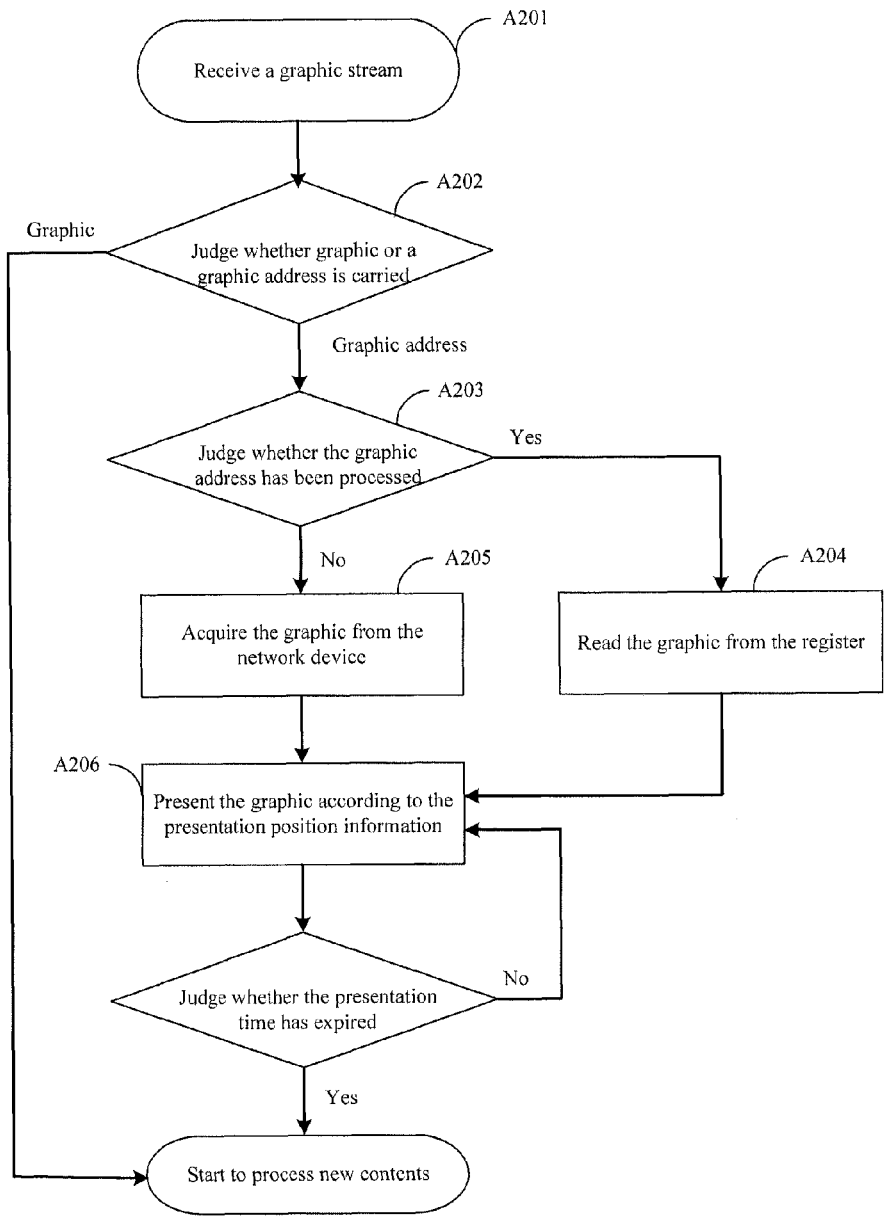
FIG. 4 is a processing flowchart of a terminal of a method according to another embodiment of the present invention.

FIG. 4 is the processing flowchart of the terminal, as described in the following:

A201. The terminal receives a graphic stream, where the graphic stream is carried by means of RTP, that is, the graphic stream is encapsulated in the RTP packet format, and is independent of a video content transmission stream.

A202. By parsing the content carried in the RTP packet, the terminal judges which one is carried in the packet, graphic or a graphic address that needs to be acquired. If a graphic is carried, the terminal processes the graphic, for example, presents the graphic, and if graphic information is carried, the terminal acquires the graphic information and further processes the graphic information, that is, step A203 is executed.

A203. According to the identifier corresponding to the graphic address and the presentation time information, the terminal judges whether the graphic address has been processed. If the terminal determines that the graphic address has been processed, step A204 is executed; or if the terminal determines that the graphic address has not been processed, step A205 is executed.

For example, an identifier recording table may be maintained, where the identifier recording table is used for recording the identifiers of the hyperlinks that have been processed and the identifiers of the hyperlinks that are being processed, and subsequently, when acquiring the graphic information, the terminal can judge, according to the identifier of the hyperlink carried in the graphic information, whether the identifier recording table has an identifier that is the same as the identifier of the hyperlink. If yes, the terminal determines that the hyperlink has been processed and therefore step A204 is executed; and if no, the terminal determines that the hyperlink has not been processed and therefore step A205 is executed.

"Has been processed" here includes "processed" and "is being processed", that is, the processed graphic include the graphic whose presentation has been suspended and the graphic that is being presented.

A204. If the terminal determines that the graphic has been saved in a register (or a graphics buffer), the terminal reads the graphic from the register, and then step A206 is executed; if the graphic has not been saved in the register, for example, the graphic was not saved temporarily when being processed previously, or, although the graphic was saved temporarily when being processed previously, the temporarily saving time expires and therefore the graphic has been deleted from the register, step A205 is executed.

Certainly, in order to reduce the signaling in the processing flow of the terminal, in addition to the foregoing method, the following definition may apply: if the graphic is not saved in the register, or the graphic has been deleted because the temporarily saving time expires, the record of the identifier of a corresponding hyperlink in the identifier recording table, which is the identifier of the graphic address, is deleted (refer to step A203). That is, the graphic that is not saved in the register and the graphic that has been deleted from the register are both deemed to be graphic that has not been processed. Therefore, step A205 may be executed directly.

A205. The terminal requests the graphic by using an interactive address, that is, requests the graphic from the network according to the graphic address.

A206. After receiving the graphic sent by network device according to the request, the terminal presents the graphic according to the presentation position information and the presentation time information carried in the RTP packet previously received, that is, received in step A201, or presents the graphic read from the register according to the graphic address information of the graphic saved in the register (refer to step A204).

For example, the graphic is displayed on the screen of the terminal according to the description of the presentation position information of the graphic, and then the terminal judges the display time of the graphic according to the presentation time of the graphic, that is, whether the presentation time expires; if the presentation time expires, the terminal stops presenting the graphic; otherwise, the terminal does not act, that is, continues to display the graphic on the screen of the terminal according to the description of the presentation position information of the graphic.

If the RTP packet carries temporarily saving time information, which may include a temporarily saving identifier and a temporarily saving time, the terminal saves the graphic in a graphic buffer, for example, in a register, after the presentation time of the graphic expires or ends, and the terminal does not delete the graphic until the temporarily saving time expires, or the graphic stream session ends. At this time, accordingly the terminal may also delete the graphic address identifier relating to the graphic from the identifier recording table (refer to the description of step A204).

The graphic stream in which the graphic is included is also carried by means of RTP, that is, the graphic stream is encapsulated in the RTP packet format, and is independent of the video content transmission stream.

Upon completion of the above steps, the terminal may start to process new content, for example, to acquire new graphic information.

As can be known from the foregoing description, in the embodiment of the present invention, the graphic information carries a hyperlink and an identifier of the hyperlink so that when the terminal receives the graphic information, the terminal can judge, according to the identifier of the hyperlink, whether the hyperlink has been processed, and the terminal requests graphic from the network according to the hyperlink only when determining that the hyperlink has not been processed, therefore ensuring an effective decrease in bandwidth consumption of broadcast or multicast channels, effectively avoiding repeated processing and presentation of a same hyperlink by the terminal, and reducing the complexity of the processing of the terminal.

Further, based on the technical solution of the embodiment of the present invention, the presentation position information, the presentation time information, and the temporarily saving time information may also be carried in the graphic information, so that the graphic can be displayed on the user's screen accurately according to the presentation position information and the presentation time information, therefore avoiding inflexible or disordered display in the prior art where the graphic can only be displayed at a fixed position or a random position of the screen, and enhancing the user experience. Furthermore, in the prior art, the user has to click the hyperlink to open the browsing window, and has to manually close the browsing window. Instead, by using the solution of the embodiment of the present invention, the terminal can automatically acquire relevant graphic according to the circumstances, therefore enhancing the user experience.

Figure 5:
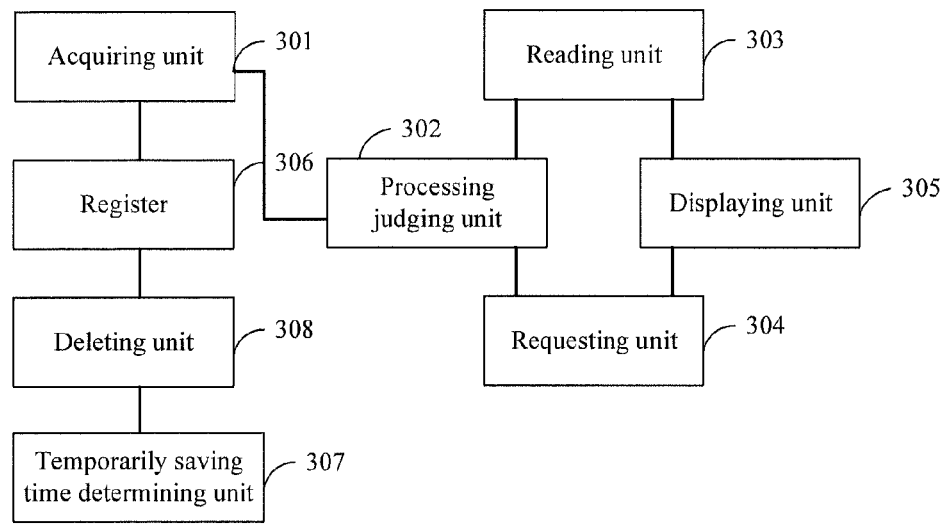
FIG. 5 is a schematic structural diagram of a terminal according to an embodiment of the present invention.

To better implement the foregoing method, an embodiment of the present invention accordingly provides a terminal. As shown in FIG. 5, the terminal includes an acquiring unit 301, a processing judging unit 302, a requesting unit 304, and a displaying unit 305.

The acquiring unit 301 is configured to acquire graphic information, where the graphic information carries a hyperlink and an identifier of the hyperlink. For example, the acquiring unit 301 may receive a graphic stream sent by the network, where the graphic stream is carried by means of RTP and is independent of a video content transmission stream. After receiving the graphic stream, the terminal parses the graphic stream, and judges which one is carried in the graphic stream, graphic or graphic information. If a graphic is carried, the terminal processes the graphic, for example, presents the graphic, or if graphic information is carried, the terminal acquires the graphic information and further processes the graphic information. Certainly, the graphic information may also carry presentation position information and/or presentation time information and/or temporarily saving time information. Details are disclosed in the foregoing embodiments and are not described here.

The processing judging unit 302 is configured to judge, according to the identifier of the hyperlink acquired by the acquiring unit 301, whether the hyperlink has been processed. For example, an identifier recording table may be maintained, where the identifier recording table is used for recording the identifiers of processed hyperlinks, and when the acquiring unit 301 acquires the graphic information, the acquiring unit 301 may judge whether the identifier recording table has an identifier that is the same as the identifier of the hyperlink carried in the graphic information; if yes, the acquiring unit 301 determines that the hyperlink has been processed; and if no, the acquiring unit 301 determines that the hyperlink has not been processed.

The requesting unit 304 is configured to acquire the graphic from the network according to the hyperlink when the processing judging unit 302 determines that the hyperlink has not been processed.

The displaying unit 305 is configured to present, according to the graphic information, the graphic acquired by the requesting unit 304. For example, if the graphic information also carries presentation position information, the displaying unit 305 determines the presentation position of the graphic according to the presentation position information in the graphic information, and displays the graphic at the presentation position. If the graphic information also carries presentation time information, the displaying unit 305 stops presenting the graphic when determining, according to the presentation time information in the graphic information, that the presentation time of the graphic expires.

The terminal may also include a reading unit 303.

The reading unit 303 is configured to acquire graphic corresponding to the link locally when the processing judging unit 302 determines that the hyperlink has been processed, for example, read the graphic corresponding to the link from a register.

The displaying unit 305 is also configured to present, according to the graphic information, the graphic acquired by the reading unit 303.

Certainly, if the graphic information also carries temporarily saving time information, the terminal may also include a register 306, a temporarily saving time determining unit 307 and a deleting unit 308.

The register 306 is configured to save the graphic when determining, according to the temporarily saving time information in the graphic information acquired by the acquiring unit 301, that the graphic is to be saved temporarily, so that the graphic can be invoked again when the presentation time of the graphic ends, that is, the reading unit 303 can read the graphic saved in itself.

The temporarily saving time determining unit 307 is configured to determine, according to the temporarily saving time information, whether the temporarily saving time of the graphic expires.

The deleting unit 308 is configured to delete the graphic from the register 306 when the temporarily saving time determining unit 307 determines that the temporarily saving time of the graphic expires. Certainly, at this time, the identifier relating to the hyperlink may also be deleted accordingly from the identifier recording table.

The specific implementation of the units is disclosed in the foregoing embodiments and is not described here.

As can be known from the foregoing description, in the embodiment of the present invention, the graphic information carries a hyperlink and an identifier of the hyperlink so that when the acquiring unit 301 of the terminal receives the graphic information, the processing judging unit 302 of the terminal can judge, according to the identifier of the hyperlink, whether the hyperlink has been processed, and the requesting unit 304 requests the graphic from the network according to the hyperlink only when the processing judging unit 302 determines that the hyperlink has not been processed, therefore ensuring an effective decrease in bandwidth consumption of broadcast or multicast channels, effectively avoiding repeated processing and presentation of a same hyperlink by the terminal, and reducing the complexity of the processing of the terminal.

Figure 6:
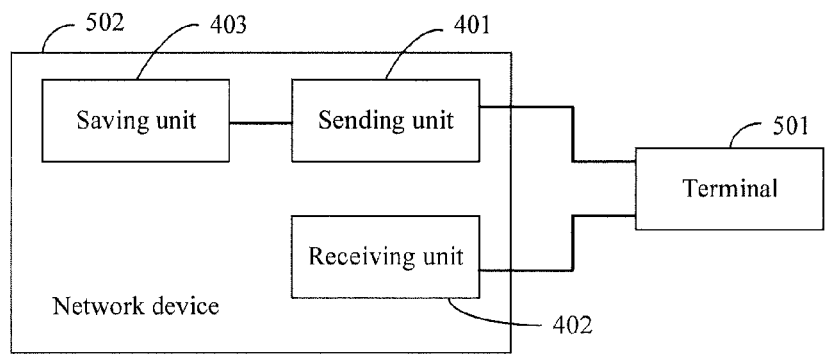
FIG. 6 is a schematic structural diagram of a network device according to an embodiment of the present invention.

Accordingly, an embodiment of the present invention also provides a network device 502. As shown in FIG. 6, the network device 502 includes a sending unit 401 and a receiving unit 402. It should be noted that in order to better describe the relationship between various units, FIG. 6 also shows a terminal 501.

The sending unit 401 is configured to send graphic information to the terminal 501, where the graphic information carries a hyperlink and an identifier of the hyperlink so that the terminal can judge, according to the identifier of the hyperlink, whether the hyperlink has been processed.

The receiving unit 402 is configured to send graphic to the terminal 501 when receiving from the terminal 501 a request for the graphic.

The network device may also include a saving unit 403.

The saving unit 403 is configured to save the graphic information that is in a standard file format. Specifically, the graphic information may be saved in a 3GP file format in the form of an independent data format, and may include an identifier of the hyperlink, the presentation position information, the presentation time information, and temporarily saving time information. Details are disclosed in the foregoing embodiments and are not provided here.

The sending unit 401 is also configured to extract graphic information from a saving unit 403 and send the extracted graphic information to the terminal 501.

The specific implementation of the units is disclosed in the foregoing embodiments and is not described here.

Figure 7:
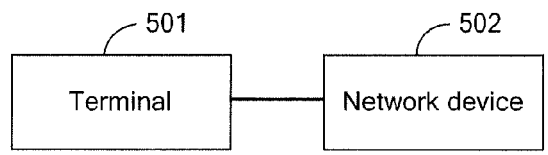
FIG. 7 is a schematic structural diagram of a communication device according to an embodiment of the present invention.

As can be known from the foregoing description, in the embodiment of the present invention, the graphic information carries a hyperlink and an identifier of the hyperlink, and the sending unit 401 of the network device 502 sends the graphic information to the terminal 501, so that the terminal 501 judges, according to the identifier of the hyperlink, whether the hyperlink has been processed, and the terminal 501 requests the graphic from the network device 502 according to the hyperlink only when determining that the hyperlink has not been processed, and the receiving unit 402 of the network device 502 sends the graphic to the terminal 501, therefore ensuring an effective decrease in bandwidth consumption of broadcast or multicast channels, effectively avoiding repeated processing and presentation of a same hyperlink by the terminal, and reducing the complexity of the processing of the terminal Accordingly, an embodiment of the present invention also provides a communication system. As shown in FIG. 7, the communication system includes a terminal 501 and a network device 502.

The terminal 501 is configured to acquire graphic information, where the graphic information carries a hyperlink and an identifier of the hyperlink; judge, according to the identifier of the hyperlink, whether the hyperlink has been processed; and when determining that the hyperlink has not been processed, acquire graphic from the network according to the hyperlink and present the acquired graphic according to the graphic information.

The network device 502 is configured to send graphic information to the terminal, and when receiving from the terminal a request for the graphic, send the graphic to the terminal, where, the graphic information carries a hyperlink and an identifier of the hyperlink.

The terminal 501 is also configured to read the graphic from a register when determining, according the identifier of the hyperlink, that the hyperlink has been processed, and present the graphics according to the graphic information.

For example, the terminal 501 may receive a graphic stream sent by the network device 502, where the graphic stream is carried by means of RTP and is independent of a video content transmission stream. After receiving the graphic stream, the terminal 501 parses the graphic stream and judges which one is carried in the graphic stream, graphic or graphic information; if the graphic is carried, the terminal 501 processes the graphic, for example, presents the graphic, and if the graphic information is carried, the terminal acquires the graphic information and judges, according to the identifier of the hyperlink in the graphic information, whether the hyperlink has been processed, for example, judges whether the identifier of the hyperlink exists in the identifier recording table; if yes, the terminal 501 reads the graphic from the register and presents the graphic according to the graphic information; and if no, requests the graphic from the network according to the hyperlink, and presents the graphic according to the graphic information. Details are disclosed in the foregoing embodiments and are not described here.

Certainly, the graphic sent by the network device 502 may further carry presentation position information and/or presentation time information and/or temporarily saving time information. Details are disclosed in the foregoing embodiments and are not described here.

Therefore, accordingly, the terminal 501 is also configured to determine the presentation position of the graphic according to the presentation position information carried in the graphic information, and display the graphic at the presentation position.

The terminal 501 is also configured to stop presenting the graphic when determining, according to the presentation time information carried in the graphic information, that the presentation time of the graphic expires.

The terminal 501 is also configured to save the graphic in the register when determining, according the temporarily saving time information carried in the graphic information, that the graphic are to be saved temporarily, so that the graphic can be invoked again when the presentation time of the graphic ends, and delete the graphic from the register when determining, according to the temporarily saving time information, that the temporarily saving time of the graphic expires.

The specific implementation of the units is disclosed in the foregoing embodiments and is not described here.

As can be known from the foregoing description, the network device 502 according to the embodiment of the present invention carries a hyperlink and an identifier of the hyperlink in the graphic information so that when the terminal 501 receives the graphic information, the terminal 501 can judge, according to the identifier of the hyperlink, whether the hyperlink has been processed, and the terminal 501 requests the graphic from the network device 502 according to the hyperlink only when determining that the hyperlink has not been processed, therefore ensuring an effective decrease in bandwidth consumption of broadcast or multicast channels, effectively avoiding repeated processing and presentation of a same hyperlink by the terminal 501, and reducing the complexity of the processing of the terminal 501.

Further, the network device 502 according to the embodiment of the present invention may also carry the presentation position information, the presentation time information, and the temporarily saving time information in the graphic information, so that the terminal 501 can display the graphic on the user's screen accurately according to the presentation position information and the presentation time information, therefore avoiding inflexible or disordered display in the prior art where the graphic can only be displayed at a fixed position or a random position of the screen, and enhancing the user experience. Furthermore, in the prior art, the user has to click the hyperlink to open the browsing window, and has to manually close the browsing window. Instead, by using the solution of the embodiment of the present invention, the terminal 501 can automatically acquire relevant graphic according to the circumstances, therefore enhancing the user experience.

An example is provided hereunder to describe the specific process flow of the communication system according to the embodiment of the present invention.

Step 1: After joining into a broadcast or multicast address, the terminal 501 starts to receive a graphic stream delivered by the network device 502, where the graphic stream is a graphic stream encapsulated in the format of an RTP packet. Here, assuming that the graphic stream carries graphic information which is saved in a 3GP file format in the form of an independent data format, the data structure saved in the 3GP file format is as follows:

```
class GraphicLinkSample
{
  unsigned int(16) linkID=0000000000000001; //The identifier of the
graphic address is 0000000000000001.
  unsigned int(8)  URLLength=40bit; //The length of the graphic
  address is 40 bits.
  unsigned int(8)  URL[URLLength]=http://www.xxx.com/
  picture/0000000000000001;
  //The content of the graphic address.
  GrapchicPositionBox    location=(0x00c80000, 0x00140000)  //The
presentation position information of the graphic is (0x00c80000,
0x00140000).
  NTPtimeBox   2890842807;   //Presentation time point.
  TmpSaveTime  5000;//The saving time in the register is 5000
  milliseconds.
}
```

Step 2: After receiving the graphic stream, the terminal 501 parses the RTP packet and knows that the identifier linkID of the graphic address is "0000000000000001", and then queries the identifier recording table. Assuming that the identifier recording table is as shown in Table 1, because Table 1 has no record of linkID that is "0000000000000001", the terminal 501 determines that the graphic address has not been processed, and therefore step 3 is executed.

TABLE 1

| No. | linkID |
|---|---|
| 1 | 0000000000000002 |
| 2 | 0000000000000003 |
| 3 | ... |

It should be noted that if at this time, Table 1 has a record of linkID that is "0000000000000001", the terminal 501 determines that the graphic have been processed, and therefore acquires the graphic corresponding to the link locally, such as from a local register, and presents the acquired graphic according to the graphic information.

Step 3: The terminal 501 requests the graphic from the network device 502 according to the graphic address "http://www.xxx.com/picture/0000000000000001" in the graphic address information.

Step 4: The network device 502 delivers the graphic requested in step 3 to the terminal 501.

Step 5: After receiving the graphic, the terminal 501 processes and presents the graphic, that is, presents the graphic according to the presentation position information and the presentation time information that are in the graphic address information, and according to the indication of the temporarily saving time information, determines whether and how long the graphic are to be temporarily saved.

In this example, the graphic are displayed at the (0x00c80000, 0x00140000) position of the screen, and the presentation time is "10 seconds". Meanwhile, the graphic are also to be saved in the register, and the saving time in the register is 5000 milliseconds.

The processing flow of the terminal is provided in the foregoing method embodiments and is not described here.

As can be known from the foregoing description, the network device 502 according to the embodiment of the present invention carries a hyperlink and an identifier of the hyperlink in the graphic information so that when the terminal 501 receives the graphic information, the terminal 501 can judge, according to the identifier of the hyperlink, whether the hyperlink has been processed, and the terminal 501 requests the graphic from the network device 502 according to the hyperlink only when determining that the hyperlink has not been processed, therefore ensuring an effective decrease in bandwidth consumption of broadcast or multicast channels, effectively avoiding repeated processing and presentation of a same hyperlink by the terminal 501, and reducing the complexity of the processing of the terminal 501.

Further, the network device 502 according to the embodiment of the present invention may also carry the presentation position information, the presentation time information, and the temporarily saving time information in the graphic information, so that the terminal 501 can display the graphic on the user's screen accurately according to the presentation position information and the presentation time information, therefore avoiding inflexible or disordered display in the prior art where the graphic can be displayed at a fixed position or a random position of the screen only, and enhancing the user experience. Furthermore, in the prior art, the user has to click the hyperlink to open the browsing window, and has to manually close the browsing window. Instead, by using the solution of the embodiment of the present invention, the terminal 501 can automatically acquire relevant graphic according to the circumstances, therefore enhancing the user experience.

Persons skilled in the art may understand that all or part of steps in the methods of the foregoing embodiments may be implemented by relevant hardware instructed by a program. The program may be stored in a computer readable storage medium, which may include a Read Only Memory (ROM, Read Only Memory), a Random Access Memory (RAM, Random Access Memory), a magnetic disk, a Compact Disk-Read Only memory (CD-ROM), and so on.

Detailed above are a method, an apparatus, and a communication system for transmitting graphic information according to the embodiments of the present invention. Although the principle and implementation of the present invention are described with reference to exemplary embodiments, the embodiments are only intended to help understand the method and core idea of the present invention. In addition, with respect to the implementation and applicability of the present invention, modifications and variations may be made by persons skilled in the art according to the idea of the present invention. Therefore, the specification shall not be construed as a limitation on the present invention.

What is claimed is:

1. A method for transmitting graphic information, comprising:

acquiring graphic information, wherein the graphic information carries a hyperlink and an identifier of the hyperlink, and further carries presentation position information and presentation time information;

judging, according to the identifier of the hyperlink and an identifier recording table, whether the hyperlink has been processed, wherein the identifier recording table is used for recording identifiers of hyperlinks that have been processed and identifiers of hyperlinks that are being processed; and when determining that the hyperlink has been processed, acquiring a graphic from a local register corresponding to the hyperlink, and displaying the graphic at a presentation position according to presentation position information; and stopping displaying the graphic when determined a time for displaying the graphic expires according to the presentation time information.

2. The method according to claim 1, wherein the graphic information further carries temporarily saving time information the method further comprising:

when determining that the hyperlink has not been processed, acquiring a graphic from a network according to the hyperlink, and saving the graphic in the local register when determined the graphic needs to be saved temporarily according to the temporarily saving time information.

3. The method according to claims 1, wherein the acquiring the graphic information comprises:

receiving a graphic stream sent by the network, wherein the graphic stream is carried by means of a Real-time Transport Protocol (RTP) and is independent of a video content transmission stream; and parsing the graphic stream and judging which one is carried in the graphic stream, graphic or graphic information, and if the graphic information is carried, acquiring the graphic information.

4. The method according to claim 1, wherein:

the judging, according to the identifier of the hyperlink, whether the hyperlink has been processed comprises:

judging whether the identifier recording table has an identifier that is the same as the identifier of the hyperlink;

if the identifier recording table has an identifier that is the same as the identifier of the hyperlink, determining that the hyperlink has been processed; and if the identifier recording table does not have an identifier that is the same as the identifier of the hyperlink, determining that the hyperlink has not been processed;

the determining that the hyperlink has not been processed further comprises: recording the identifier of the hyperlink in the identifier recording table.

5. A terminal, comprising:

an acquiring unit, configured to acquire graphic information, wherein the graphic information carries a hyperlink and an identifier of the hyperlink, and further carries presentation position information and presentation time information;

a processing judging unit, configured to judge, according to the identifier of the hyperlink and an identifier recording table, whether the hyperlink has been processed, wherein the identifier recording table is used for recording identifiers of hyperlinks that have been processed and identifiers of hyperlinks that are being processed;

a reading unit, configured to acquire graphic from a local register corresponding to the hyperlink when the processing judging unit determines that the hyperlink has been processed; and a displaying unit, configured to display the graphic acquired by the reading unit at a presentation position, according to the presentation position information;

and stopping displaying the graphic when determined a time for displaying the graphic expires according to the presentation time information.

6. The terminal according to claim 5, wherein the terminal further comprises a requesting unit;

the requesting unit is configured to acquire graphic from a network according to the hyperlink when the processing judging unit determines that the hyperlink has not been processed; and the displaying unit is further configured to present, according to the graphic information, the graphic acquired by the reading unit.

7. The terminal according to claim 5, wherein the graphic information further carries temporarily saving time information, and the terminal further comprises a register, a temporarily saving time determining unit and a deleting unit;

the register is configured to save the graphic when determining, according to the temporarily saving time information in the graphic information acquired by the acquiring unit, that the acquired graphic is to be saved temporarily, so that the graphic is able to be invoked again when the presentation time of the graphic ends;

the temporarily saving time determining unit is configured to determine, according to the temporarily saving time information, whether the temporarily saving time of the graphic expires; and the deleting unit is configured to delete the graphic from the register when the temporarily saving time determining unit determines that the temporarily saving time of the graphic expires.

8. A communication system, comprising a terminal and a network device, wherein:

the terminal is configured to:

acquire graphic information, wherein the graphic information carries a hyperlink and an identifier of the hyperlink, and further carries presentation position information and presentation time information;

judge, according to the identifier of the hyperlink and an identifier recording table, whether the hyperlink has been processed, wherein the identifier recording table is used for recording identifiers of hyperlinks that have been processed and identifiers of hyperlinks that are being processed; and when determined that the hyperlink has not been processed, acquire graphic from a local register corresponding to the hyperlink and displaying the acquired graphic at a presentation position according to the presentation position information;

stopping displaying the graphic when determined a time for displaying the graphic expires according to the presentation time information; and the network device is configured to send the graphic information to the terminal, and when receiving a request for the graphic from the terminal, send the graphic to the terminal.

9. The communication system according to claim 8, the terminal is further configured to acquire graphic from a network according to the hyperlink when determining, according to the identifier of the hyperlink, that the hyperlink has not been processed, and present the acquired graphic according to the graphic information.

\* \* \* \* \*